(12) United States Patent
Rojas

(10) Patent No.: US 8,775,119 B2
(45) Date of Patent: Jul. 8, 2014

(54) SYSTEM AND METHOD FOR FOREST MANAGEMENT USING STAND DEVELOPMENT PERFORMANCE AS MEASURED BY LAI

(75) Inventor: Julio C. Rojas, Columbus, MS (US)

(73) Assignee: Weyerhaeuser NR Company, Federal Way, WA (US)

( * ) Notice: Subject to any disclaimer, the term of this patent is extended or adjusted under 35 U.S.C. 154(b) by 283 days.

(21) Appl. No.: 13/076,086

(22) Filed: Mar. 30, 2011

(65) Prior Publication Data

US 2012/0253740 A1 Oct. 4, 2012

(51) Int. Cl.
*G06F 15/00* (2006.01)

(52) U.S. Cl.
USPC ............... 702/156; 702/2; 702/5; 382/110

(58) Field of Classification Search
USPC ........................................... 702/156
See application file for complete search history.

(56) References Cited

U.S. PATENT DOCUMENTS

| 2004/0130702 | A1 | 7/2004 | Jupp | |
|---|---|---|---|---|
| 2009/0022359 | A1* | 1/2009 | Kang et al. | 382/100 |
| 2010/0158314 | A1 | 6/2010 | Ma | |
| 2010/0328659 | A1 | 12/2010 | Bodkin | |
| 2011/0047867 | A1 | 3/2011 | Holland | |
| 2011/0055220 | A1 | 3/2011 | Tyburski | |

OTHER PUBLICATIONS

James M. Vose, Philliip M. Dougherty, James N. Long, Fredick W. Smith, Henry L. Gholz, Paul J. Curran. Factors Influencing the Amount and Distribution of Leaf Area of Pine Stands. Ecological Bulletins 43, pp. 102-114, (1994). Copenhagen.

Tiit Nilson, Urmas Peterson. Age Dependence of Forest Reflectance: Analysis of Main Driving Factors. Remote Sens. Environ. 48:319-331 (1994).

Francisco J. Flores, H. Lee Allen, Heather M. Cheshire, Jerry M. Davis, Montserrat Fuentes, Daniel Kelting. Using Multispectral Satellite Imagery to Estimate Leaf Area and Response to Silvicultural Treatments in Loblolly Pine Stands. Can. J. Dor. Res. 36: 1587-1596 (2006). Canada.

J.C. Rojas, Factors influencing responses of loblolly pine stands to fertilization. Ph.D. Dissertation. Dept. of Forestry, North Carolina State Univ., Raleigh, NC. 147pp. (2005).

* cited by examiner

*Primary Examiner* — Jonathan C Teixeira Moffat
*Assistant Examiner* — Hien Vo
(74) *Attorney, Agent, or Firm* — Perkins Coie LLP

(57) ABSTRACT

A system and method for identifying stands or portions thereof that are not growing as expected. In one embodiment, a computer system compares a measured leaf area index of a stand that is determined from remotely sensed data to an expected leaf area index. The computer system identifies stands or portions of stands where the measured leaf area index is greater than the expected leaf area index and/or stands or portions of stands where the measured leaf area index is less than the expected leaf area index. In one embodiment, the comparison is used to identify stands or portions thereof where silviculture treatments may be necessary.

16 Claims, 4 Drawing Sheets

SYSTEM AND METHOD FOR FOREST MANAGEMENT USING STAND DEVELOPMENT PERFORMANCE AS MEASURED BY LAI

TECHNICAL FIELD

The technology disclosed herein relates to computer systems for use in forest management and in particular to systems for identifying stands or portions thereof that are not growing as expected and/or for recommending stands for silviculture treatments.

BACKGROUND

In the commercial growing and harvesting of forest products, trees are not simply planted and harvested at a predetermined time in the future. Instead, many silviculture techniques may be applied to a forest stand during its growth cycle in order to achieve an optimal yield for a particular type of forest product. Such techniques can include selective thinning of desired trees, the removal of competing trees, brush or other vegetation, the application of fertilizer, etc.

One difficulty encountered in active management forestry is to know which stands are not growing as expected and therefore may need fertilization, thinning or the administration of other silvicultural techniques. The conventional method of forest management is to send foresters into a stand to physically survey the stand and recommend the application of one or more silviculture techniques if needed. While such an approach can work for relatively small forests, it can be cost prohibitive to physically inspect all the areas of large commercial forests that may extend over a wide large geographical area. In addition, even if physical inspection is possible, a survey crew generally doesn't know ahead of time what the condition of the stand will be prior to its inspection. Therefore, the crew often has to return to the site with the proper equipment in order to perform a recommended silviculture technique.

DETAILED DESCRIPTION

As indicated above, one challenge faced by foresters and forest product companies is being able to determine how a stand of trees is growing in a cost effective manner. If it is known that a stand is not growing as expected, a forester can recommend that one or more silviculture treatments be applied to the stand in order to improve its growth performance. While foresters could determine stand conditions if the stand is physically inspected, it is often cost prohibitive, subjective in nature due to how different foresters interpret the condition of a stand, and sometimes physically impossible to physically inspect every acre of each stand in a forest. In addition, even if a stand is physically inspected and a forester makes recommendations for particular silviculture techniques to be applied, the forester may not have the appropriate tools or equipment readily at hand in order to apply the recommended technique. Therefore, the forester has to return with the appropriate equipment to apply the recommended technique, thus increasing the overall cost and time required for forest management.

To address these problems and others, the disclosed technology is a computer system that operates to estimate how tree stands or portions thereof are growing in a forest. In one embodiment, the computer system identifies stands that are not growing as expected so that a forester can recommend the application of one or more silviculture treatments to the stand.

In one embodiment, a computer system uses remotely sensed data to determine whether a forest stand is growing as expected. Stands that are growing at a rate that is greater than expected are classified as over performing stands while those that are growing at a rate that is less than expected are classified as under performing stands.

While it may seem counterintuitive that over performing stands may need the application of a silviculture treatment, such stands typically contain undesired trees or other vegetation that can be detected by remote sensing equipment and that are competing with a desired tree species in the stand. Therefore, the treatment applied to such stands usually involves the removal of the undesired trees or competing vegetation by thinning, applying herbicides or other vegetation control methods. On the other hand, under performing stands may indicate mortality problems due to insects, diseases, fire, or competition with undesired vegetation that could be undetected by remote sensing equipment (e.g. deciduous species will not be detected by remote sensing data if collected in winter time). Treatments applied to underperforming stands may include the removal of undesired vegetation and/or the application of fertilizers to the stand.

Figure 1:
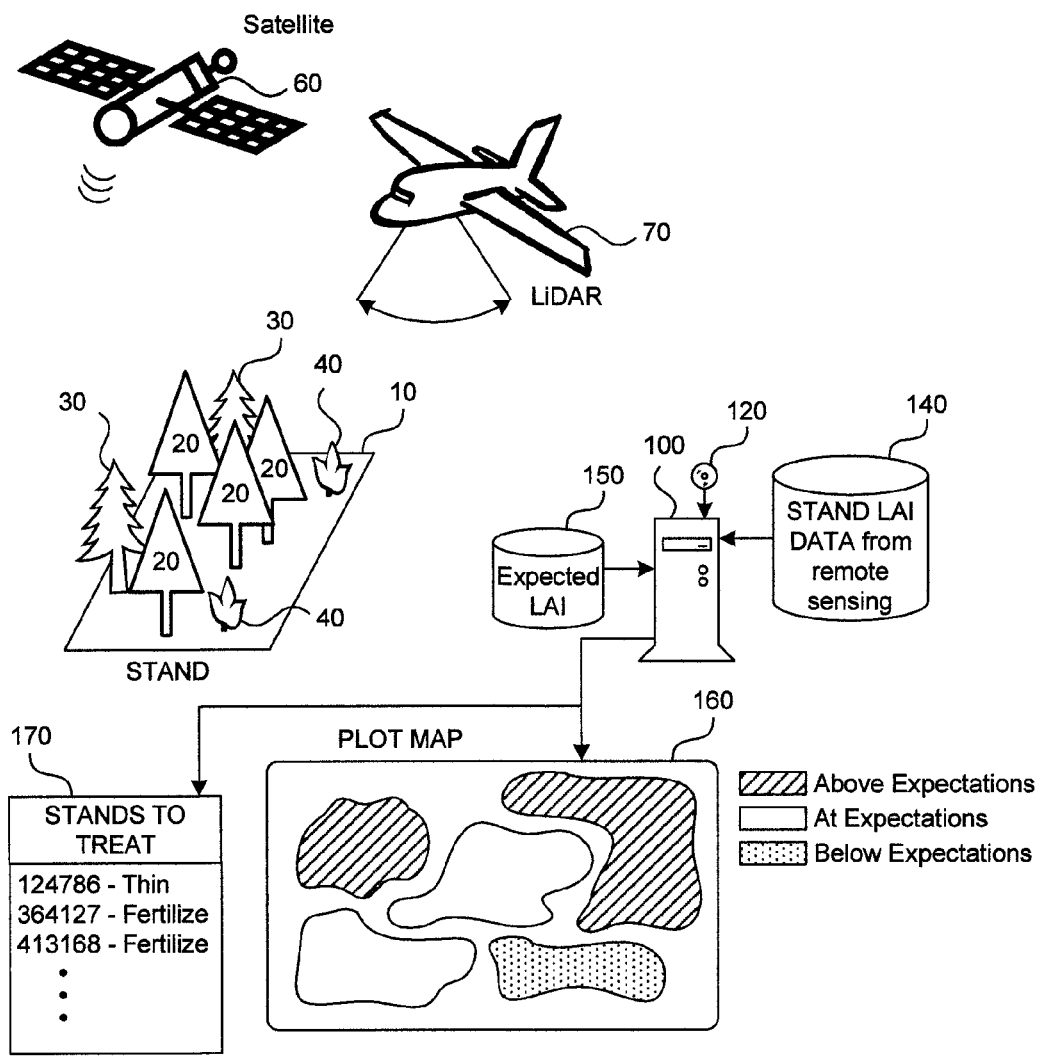
FIG. 1 illustrates a computer system for assessing how stand is growing and/or for identifying stands that may need the application of one or more silviculture techniques in accordance with an embodiment of the disclosed technology.

In accordance with one embodiment of the disclosed technology, how well a stand is growing in a forest is determined by comparing the current leaf area index of the stand to an expected leaf area index. In one embodiment, the leaf area index is measured from remotely sensed data. FIG. 1 illustrates a system for estimating how well a stand is growing from remotely sensed data. As shown, a forest stand 10 is planted with a desired species of trees 20. In addition, the stand may include one or more unwanted species of trees 30 that can become established by, for example, natural seeding. The undesirable species of trees 30 may compete for light, nutrients and water with the desired species of tree 20 to be grown in the stand. In addition, the stand 10 may include vegetation 40 such as shrubs and the like that also compete with the desired species 20 for water and nutrients, etc.

To estimate how well the desired species 20 in the stand is growing, the leaf area index (LAI) for the stand 10 is measured. In one embodiment, remotely sensed data are obtained from satellite images such as the type available from the Landsat imaging system 60. The satellite imaging system is used to capture an image of the geographic region that includes the stand 10. The leaf area index of a stand can be calculated from the satellite images of the stand as will be explained below.

As will be appreciated by those skilled in the art, satellite images often contain image data that is obtained in multiple spectral bands. In one embodment, the leaf area index of a stand is calculated from the vegetation indexes (VI) of a stand. As will be appreciated by those skilled in the art of remote sensing and forestry, the VI for a stand is based on ratios of the reflectance detected in the red and near infrared spectral bands. The techniques and equations for calculating the leaf area index from the corresponding VI in an area of a satellite image are well-known to those of ordinary skill in the art.

In another embodiment, the leaf area index of a stand is measured from other types of remotely sensed data such as Light Detection and Ranging (LiDAR). As will be appreciated by those skilled in the art, LiDAR data represents the detection of a laser pulse that is carried over a forest or other area of interest by an aircraft, such as a helicopter or a fixed wing airplane 70. A LiDAR system carried over the area of interest directs a pulsed laser beam towards the ground. Laser pulses that are reflected back to the LiDAR system are detected. Because the altitude and location of the aircraft are known, each detected pulse can be assigned a three dimensional position to create a topographical map of the ground over which the aircraft is flown.

In one embodiment, the leaf area index for a forest stand is calculated from LiDAR data points having a height that falls within an expected canopy height of the forest. In one embodiment, LiDAR data points are detected that have a height above ground that is within an expected canopy height that is statistically determined or modeled for the tree species in the stand, the age of trees, the geographic area of the stand, soil conditions and other factors. The leaf area index for a stand or portion thereof is determined by comparing the number of reflected LiDAR data points in this height range to the total number of LiDAR data points detected. However, other techniques for determining the leaf area index such as aerial multi-spectral imagery or hyperspectral imagery could also be used. Furthermore, hand held devices for measuring the leaf area index could be used.

Once the leaf area index of the stand 10 is measured from the remotely sensed data, it is compared to an expected leaf area index. If the measured leaf area index of a stand is higher than expected, the stand is classified as over performing. In such a stand, it is likely that unwanted species 30 and/or vegetation 40 are growing in the stand and competing with the desired species of trees 20. Therefore, such a stand may be identified as needing selective thinning and/or the application of herbicides of other silviculture treatments to control competition. Alternatively, if the measured leaf area index of the stand 10 or portion thereof is less than an expected leaf area index, such a stand is identified as under performing and may be also be marked for the application of hardwood competing vegetation release, fertilizer, or other treatments to increase the growth of desired trees in the stand.

In accordance with one embodiment of the disclosed technology, a computer system 100 executes a sequence of program instructions stored on a non-transitory computer readable media 120 such as a CD ROM, hard drive, DVD, flash drive etc. Alternatively, the program instructions can be received from a remote computer over a computer communication link such as the Internet. Processor electronics within the computer system 100 execute the program instructions to estimate how well each stand or portion of a stand is growing. In one embodiment, the computer system 100 operates to receive remotely sensed data for an area of interest that includes the stand in question from a database 140. From the remotely sensed data, the leaf area index for a stand is measured. In one embodiment, the remotely sensed data comes from satellite images of the area of interest. In another embodiment, the remotely sensed data is LiDAR data. The measured leaf area index for the stand in question is compared against an expected leaf area index for the stand.

The computer system 100 identifies stands that have a measured leaf area index that is greater than or less than the expected leaf area index determined for the stand and stored in a database 150. In one embodiment, the computer system produces a map 160 that identifies stands or portions of stands where the measured leaf area index is greater than, equal to or less than the expected leaf area index for the stand. The map 160 can be in electronic form for viewing on a computer monitor or the like. Alternatively, the map 160 can be printed on paper or other media. The map 160 identifies geographic locations where foresters may consider the application of silviculture techniques in accordance with how the measured leaf area index for the stand compares with the expected leaf area index for the stand. Alternatively, the computer system 100 can produce a list 170 that identifies stands or portions of stands where treatments are recommended. The list may specify the type of treatment to be applied to the stand. Alternatively, the list 170 may identify stands or portions of stands that are either over or under performing and a forester or other individual can determine what treatments are needed.

Figure 2:
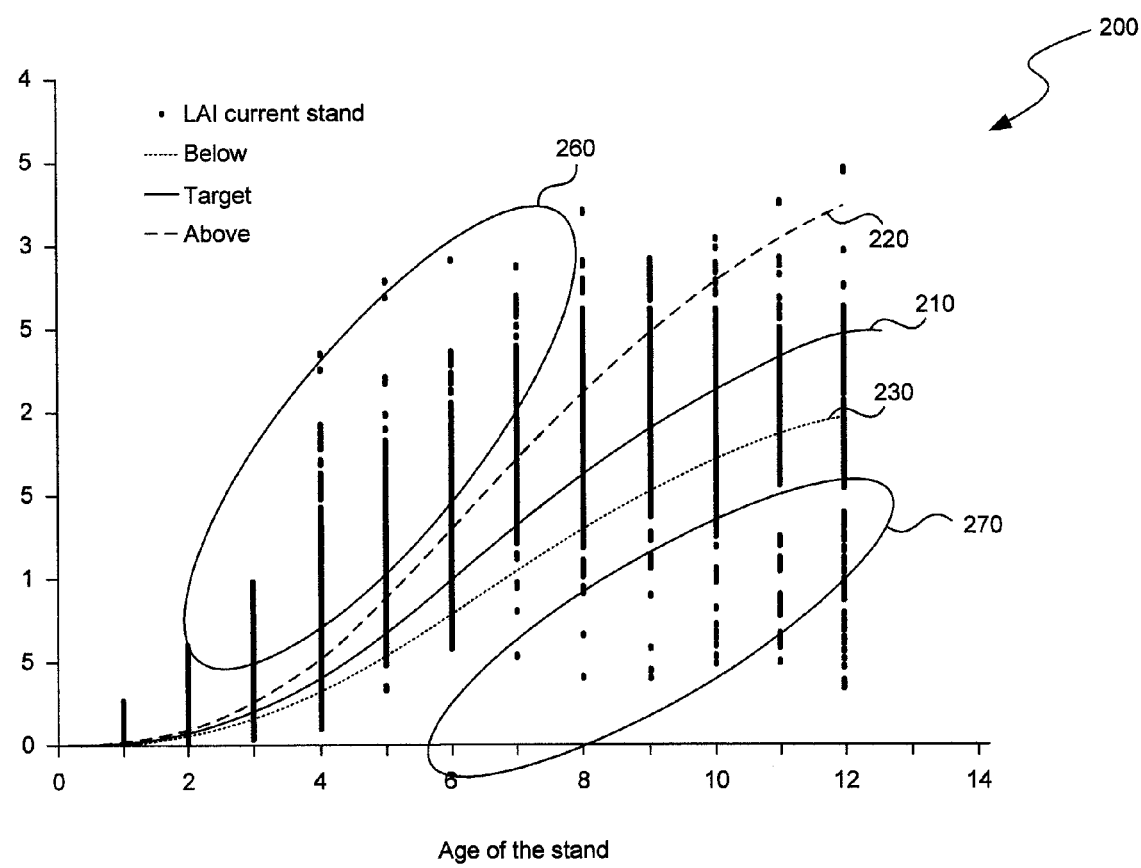
FIG. 2 illustrates a representative plot of a leaf area index versus the age of a stand for a number of different forest stands.

FIG. 2 illustrates a plot 200 of a number of points each representing the measured leaf area index of a stand versus the age of the trees in the stand. The leaf area index measured for each point in the plot 200 may be determined via any number of techniques such as by measuring the leaf area index from remotely sensed data such as satellite images or LiDAR data. Alternatively, the leaf area index of a stand may be measured from a physical inspection of the stand using light measurement tools such as the LAI-2000 available from LiCOR BioSciences or the Accupar LP-80 available from Decagon Devices Inc., or from a mathematical growth model. Although the graph illustrated in FIG. 2 shows the measured leaf area index values for stands up to 12 years in age, it will be appreciated that measurements can be taken for stands of any age up to harvest.

Once enough data points have been determined for a particular species represented by the plot 200, the average expected leaf area index 210 can be determined and graphed versus the age of the stand. Additional statistical techniques can be used to determine an upper normal range 220 and a lower normal range 230. The area between the lower normal range 230 and the upper normal range 220 defines the expected leaf area index of the tree species versus age. Once the expected leaf area index is measured for a stand or portion of a stand in question, the measured leaf area index for the stand in question is compared to the expected leaf area index.

In the plot shown in FIG. 2, a region 260 identifies LAI/stand age values where the leaf area index is greater than the expected leaf area index. Similarly, a region 270 identifies LAI/stand age values where the leaf area index is below the expected leaf area index.

In another embodiment, the expected leaf area index of a stand can be determined from a growth model that is specific to the species in question. The growth model can take into account such factors as the geographic location of a stand, the soil conditions of the stand, silviculture techniques applied to the stand (e.g., thinning, fertilizer, etc.), weather conditions and other factors. The growth model is typically empirical in nature and is determined from many years of ground truth measurements and other collected data. The expected growth values from the model can then be converted to expected values of leaf area index by utilizing the growth efficiency (GE), normally defined as the growth per unit of leaf area.

Figure 3:
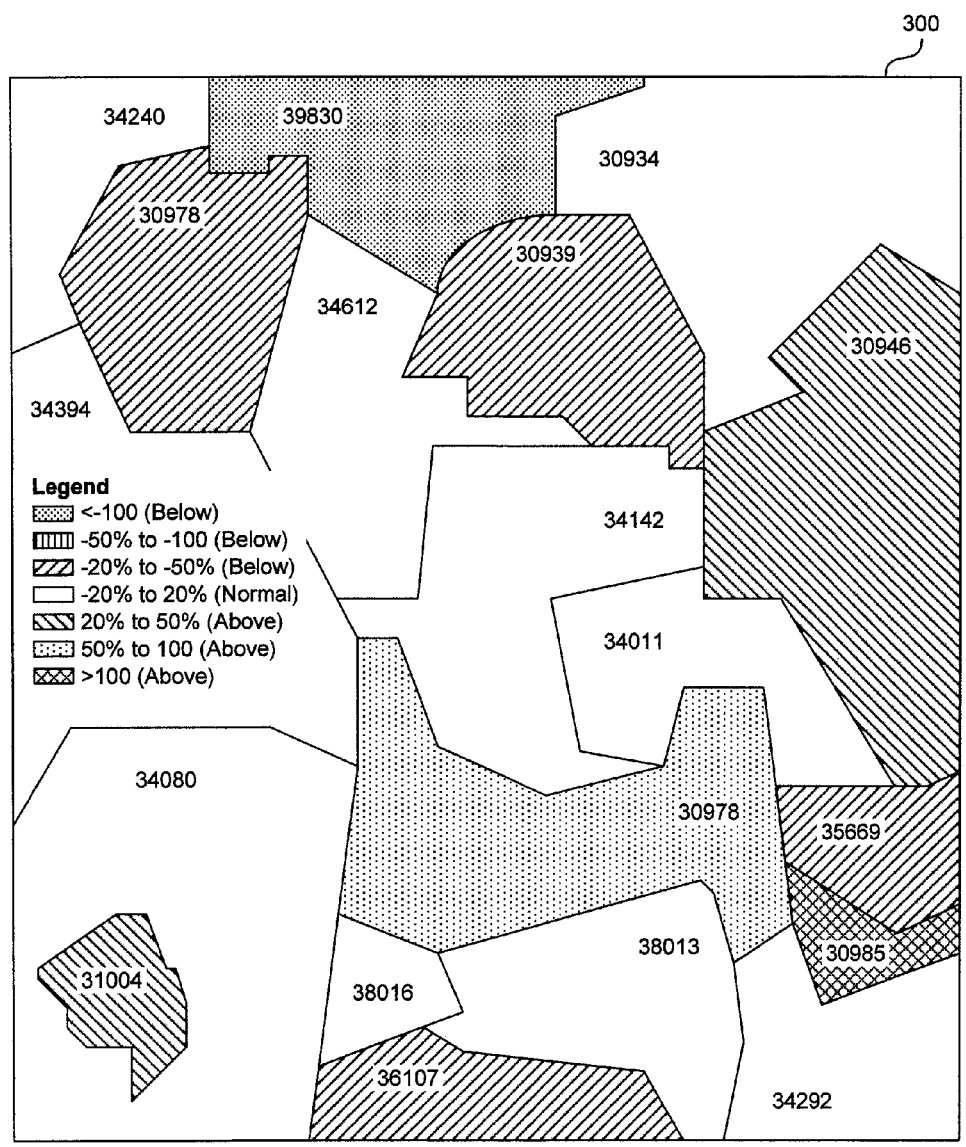
FIG. 3 illustrates a map produced in accordance with an embodiment of the disclosed technology that identifies the location of over and/or underperforming tree stands or portions thereof in accordance with an embodiment of the disclosed technology.

FIG. 3 illustrates a chart or map 300 produced by the computer system that indicates the boundaries of individual stands in a forest region. The chart 300 shows how the leaf area index measured for small portions of a stand (i.e., pixels in the chart) compares with an expected leaf area index. In one embodiment, each pixel in the chart 300 represents an area of approximately 100 feet by 100 feet. However, it will be appreciated that other pixel areas could be used depending on the resolution of the remote sensing equipment used to determine the leaf area index By measuring and comparing the leaf area index for regions that are smaller than the entire stand, it can easily be seen if an entire stand may need silviculture treatments or just a portion of the stand. Each pixel in the chart 300 can be color-coded or otherwise differentiated depending upon the comparison of the measured leaf area index and the expected leaf area index. The chart 300 may be shown on a computer display or printed. In another embodiment, those stands or portions of stands that have measured leaf area indices that are above or below the expected leaf area index can be included in a report. The stands or portions of the stands can be identified by number or by geographic coordinates so that foresters can determine what, if any, treatments need to be applied.

In yet another embodiment, the computer system makes a recommendation of what treatment should be applied to a stand or portion thereof based on the comparison of the measured leaf area index with the expected leaf area index.

Figure 4:
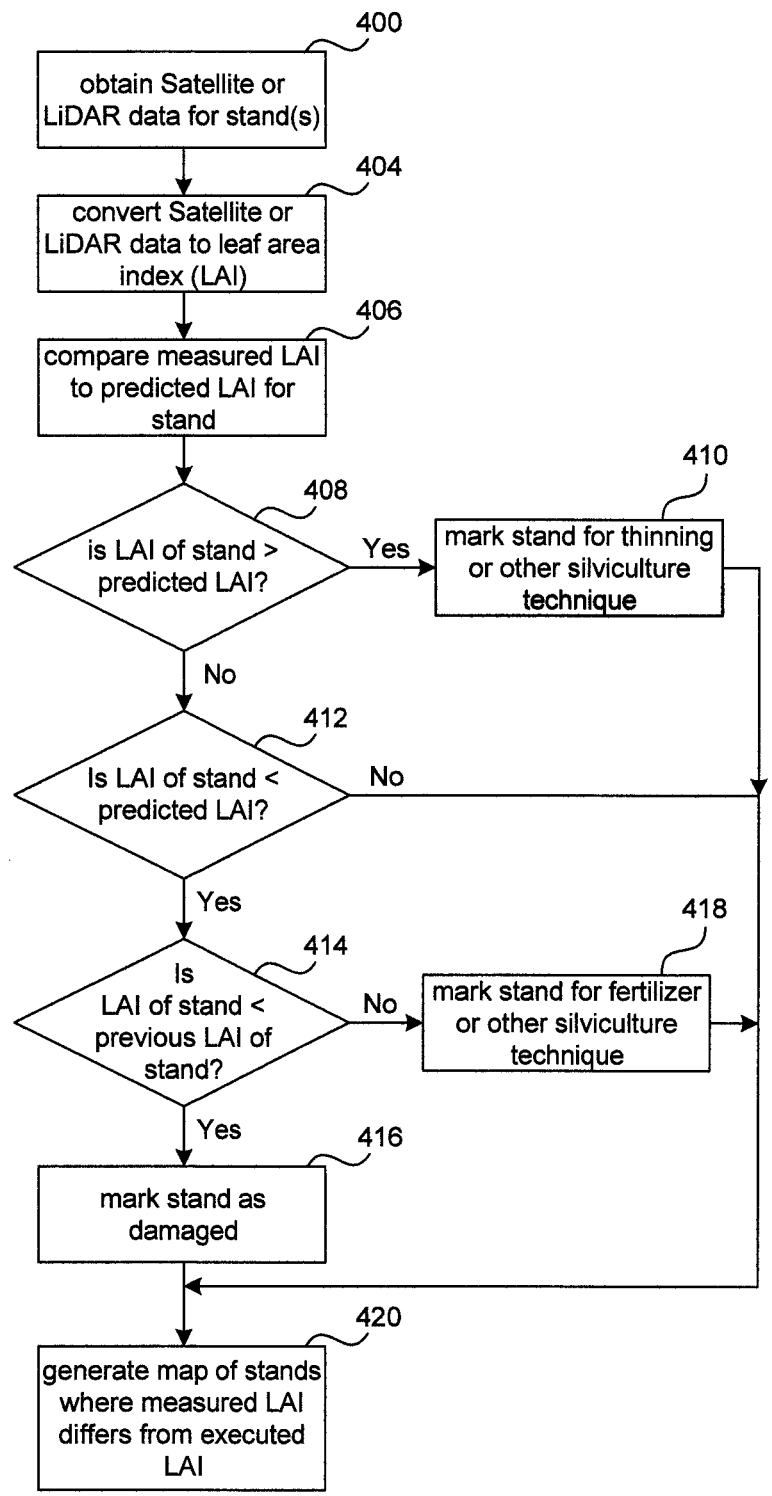
FIG. 4 is a flowchart of steps performed in accordance with one embodiment of the disclosed technology to identify over and/or underperforming tree stands and/or for recommending silviculture treatments for the stands.

FIG. 4 illustrates a flowchart of steps performed by a computer system in accordance with one embodiment of the disclosed technology to estimate how well a stand is growing by comparing the measured leaf area index of the stand as determined from remotely sensed data with an expected leaf area index.

Beginning at 400, a computer system receives remotely sensed data, such as Landsat image data or LiDAR data for a stand or portion thereof. At 404, the computer system converts the remotely sensed data to a measured leaf area index for the stand. At 406, the computer system compares the measured leaf area index for the stand to an expected leaf area index.

At 408, it is determined if the measured leaf area index of the stand is greater than the expected leaf area index. If so, the stand is marked for thinning or other silviculture techniques at 410. Such techniques generally serve to remove or decrease vegetation that is competing with the desired species in the stand.

If the answer at 408 is no, the computer determines at 412 if the measured leaf area index of the stand is less than the expected leaf area index. If so, the current leaf area index is compared to one or more leaf area index values from previous years at 414. If the stand leaf area index shows continued declining values, the stand is marked at 416 as potentially being damaged such as from insects, disease or from natural causes, e.g., storms, etc. If the stand leaf area index shows a slow increase of leaf area index from a previously measured leaf area index, the stand is marked at 418 for hardwood release, fertilization or other silviculture techniques that may increase the growth rate of desired species in the stand.

At 420, the computer system generates a map or list that identifies those stands or portions thereof where the measured leaf area index is greater than or less than (i.e., differs from) the expected leaf area index. In addition, or alternatively, the computer system can produce reports with lists showing stands or portions thereof where the measured leaf area index differs from the expected leaf area index. The report may also suggest a particular silviculture treatment to be applied.

By viewing the map or the reports of where the measured leaf area index differs from an expected leaf area index, a forester or other individual can prescribe the application of one or more silviculture treatments. Alternatively, the location of such stands or portions thereof can be put on a list to physically inspect before making such a recommendation. In addition, because the map or list shows if a stand is over or under performing, the forester can be prepared to treat the stand so that the correct tools are brought along when expecting a stand, thereby reducing the chance that multiple trips are necessary to treat the stand.

Although the disclosed technology is described in terms of growing trees, it will be appreciated that the technology can be used for other crops as well. For example, the technology can be used for determining if other crops such as bamboo, rice, corn, wheat or other vegetation are growing as expected. Therefore, the term "stand" is meant to include more than just a stand of trees.

Embodiments of the subject matter and the operations described in this specification can be implemented in digital electronic circuitry, in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer readable medium for execution by, or to control the operation of, data processing apparatus.

The non-transitory computer readable medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory, a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user, a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:
1. A computer system comprising:
 a memory for storing a sequence of program instructions;
 processor electronics configured to execute the program instructions to identify stands of vegetation that are not growing as expected by:
  measuring a leaf area index for a stand of vegetation or portion thereof of a certain age;
  comparing the measured leaf area index to an expected leaf area index determined for an age of vegetation corresponding to the age of the vegetation in the stand; and
  identifying stands or portions thereof as over performing or underperforming where the measured leaf area index differs from the expected leaf area index.

2. The computer system of claim 1, wherein the processor electronics are configured to execute program instructions to produce a map that indicates one or more stands or portions thereof where the measured leaf area index is above the expected leaf area index.

3. The computer system of claim 1, wherein the processor electronics are configured to execute program instructions to produce a map that indicates one or more stands or portions thereof where the measured leaf area index is below the expected leaf area index.

4. The computer system of claim 1, wherein the processor electronics are configured to execute program instructions to measure the leaf area index of a stand from LiDAR data.

5. The computer system of claim 1, wherein the processor electronics are configured to execute program instructions to measure the leaf area index of a stand from satellite image data.

6. The computer system of claim 1, wherein the processor electronics are configured to execute program instructions to measure the leaf area index of a stand from aerial multispectral data.

7. The computer system of claim 1, wherein the processor electronics are configured to execute program instructions to measure the leaf area index of a stand from aerial hyperspectral data.

8. The computer system of claim 1, wherein the processor electronics are configured to produce a report listing one or more silviculture treatments to be applied to a stand based on the comparison of the measured leaf area index and the expected leaf area index.

9. A non-transitory computer readable media with instructions thereon that are executable by processor electronics to identify stands that are not growing as expected by:
measuring a leaf area index for a stand of vegetation or portion thereof of a certain age;
comparing the measured leaf area index to an expected leaf area index determined for an age of vegetation corresponding to the age of the vegetation in the stand; and
identifying stands or portions thereof as over performing or underperforming where the measured leaf area index differs from the expected leaf area index.

10. The non-transitory computer readable media of claim 9, further comprising: instructions executable by the processor electronics to produce a map that indicates one or more stands or portions thereof where the determined leaf area index is above the expected leaf area index.

11. The non-transitory computer readable media of claim 9, further comprising: instructions executable by the processor electronics to produce a map that indicates one or more stands or portions thereof where the measured leaf area index is below the expected leaf area index.

12. The non-transitory computer readable media of claim 9, further comprising: instructions executable by the processor electronics to measure the leaf area index of a stand from LiDAR data.

13. The non-transitory computer readable media of claim 9, further comprising: instructions executable by the processor electronics to determine a leaf area index of a stand from satellite image data.

14. The non-transitory computer readable media of claim 9, further comprising: instructions executable by the processor electronics to measure a leaf area index of a stand from aerial multispectral data.

15. The non-transitory computer readable media of claim 9, further comprising: instructions executable by the processor electronics to measure a leaf area index of a stand from aerial hyperspectral data.

16. The non-transitory computer readable media of claim 9, further comprising: instructions executable by the processor electronics produce a report, listing one or more silviculture treatments to be applied to a stand based on the comparison of the measured leaf area index and the expected leaf area index.

* * * * *